(No Model.)
F. P. HARBAUGH.
ICE CREAM FREEZER.
No. 477,211. Patented June 21, 1892.
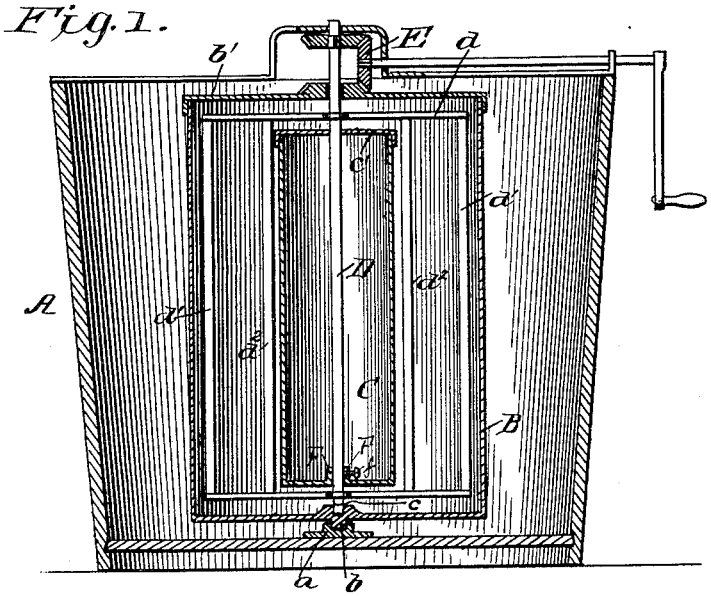
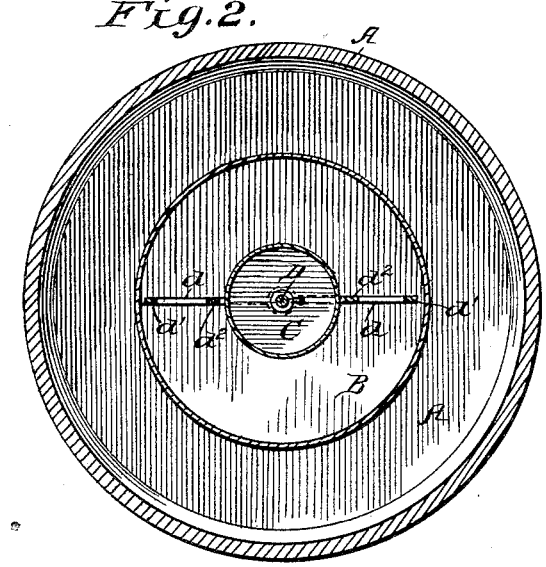
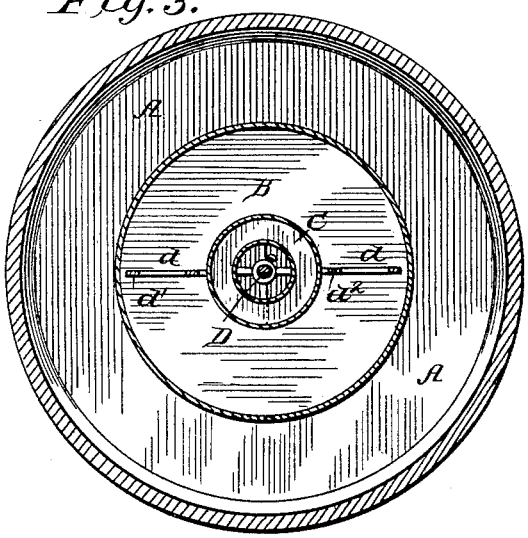
WITNESSES:
Fred G. Dieterich
M. D. Blondel
INVENTOR:
F. P. Harbaugh.
BY Munn & Co.
ATTORNEYS

United States Patent Office.

FRANK P. HARBAUGH, OF CHAMBERSBURG, PENNSYLVANIA.

ICE-CREAM FREEZER.

SPECIFICATION forming part of Letters Patent No. 477,211, dated June 21, 1892.

Application filed July 15, 1890. Serial No. 358,822. (No model.)

*To all whom it may concern:*

Be it known that I, FRANK P. HARBAUGH, a citizen of the United States, residing at Chambersburg, in the county of Franklin and State of Pennsylvania, have invented a new and Improved Method of Freezing Ice-Cream and other Liquids, of which the following is a specification.

My invention relates to an improved apparatus for freezing liquid compounds, such as cream, custards, &c.

The object of my invention is to freeze a mixture much more rapidly than is now done, thereby producing very economically a more homogeneous mass and one that is entirely free from butter. These objects are accomplished by the apparatus hereinafter described and claimed.

In the drawings, Figure 1 is a sectional view of a freezer adapted to be used in carrying out my invention. Fig. 2 is a horizontal section, and Fig. 3 is a similar view of a slightly-modified form.

Heretofore it has generally been the practice to surround the vessel containing the liquid to be frozen with a freezing mixture and revolving the vessel and also an agitator within the same, in order to prevent the liquid freezing at the sides before it does at the center. All of these contrivances have fallen short of their objects.

My invention has the same prime objects, and I accomplish them by simultaneously exposing the exterior and central portions of the liquid to be frozen to the actions of freezing mixtures and revolving the same. In this way the inner and outer portions of the liquid freeze simultaneously and the revolution insures an even homogeneous mass.

In carrying out my invention I employ a tub or other receptacle A, which is provided with a central pivotal socket $a$, and within the tub A is arranged a cream can or vessel B, provided with a pivot $b$, which fits in the socket $a$. A freezing agent—such as ice, &c.—is packed around the vessel B within the tub A. A central can or vessel C is arranged in the can or vessel B. The vessel C may be stationary, but is preferably mounted upon a shaft D, which passes through the same, the lower end resting in the socket $c$ in the bottom of the vessel B. A boss or hub F is attached or made integral with the bottom of the can or vessel C, and through this hub or boss extends the shaft D. The can C is attached to the shaft D at the desired elevation by a set-screw $f$, which works through the hub or boss and bears tightly against the shaft D. The vessel C is provided with a cover $c'$, sliding on the rod or shaft D. The can or vessel B is provided with a cover $b'$, which also slides over the upper end of the shaft D, the end of said shaft extending upward above the top of the tub A. The tub is provided with the driving-gear E, arranged and secured in the usual manner, the gearing being of such character that the shaft D and can B are revolved independently. Horizontal arms $d$ are arranged upon the shaft D, near its upper and lower ends, and between the outer ends of said arms are secured the agitator wings or blades $d'$ and near their center are secured the wings or blades $d^2$, the blade $d'$ being adapted to revolve near the interior walls of the can or vessel B and the wings $d^2$ being adapted to revolve near the exterior walls of the vessel C. By this construction there is no settling and freezing at one point sooner than at another.

The can B is first put in position and ice packed around the same. The vessel C is then filled with ice, &c., or any other freezing mixture and arranged within the vessel B. The vessel B is then filled with the liquid to be frozen and covered, as before described. The liquid is thus simultaneously exposed to the action of freezing agents both from the exterior and from the center thereof. If it is desired to agitate the mixture while freezing, the dasher mechanism hereinbefore described is arranged in the vessel B previous to its being filled.

If desired, the vessel C may be made annular in shape, as shown in Fig. 3, whereby the cooling-surface is increased without increasing the amount of cooling agent.

From the above it will be seen that by my apparatus the liquid in the vessel B will be frozen very quickly and that no portion of the same will freeze sooner than another, and that in consequence of the short agitation it will be entirely free from butter and lumps, but present a fine even-grained and homogeneous mass.

Having thus described my invention, what I claim as new is—

In a freezer, the combination of a tub A, a liquid-receiving vessel B, provided with a central depending pivot adapted to be seated in a socket in the bottom of the tub A, a shaft D, having its lower end fitted in a central socket in the bottom of the vessel B and its upper end extended above said vessel, an ice-can C, fitted around the shaft D within the vessel B and provided with an internal hub or boss F, a set-screw $f$, working through such hub or boss and bearing against the shaft D, a series of dasher-blades carried by the shaft D and working near the exterior surface of the can C and the interior surface of the vessel B, and driving mechanism connected to the upper portion of the shaft D, substantially as shown and described, for the purpose set forth.

FRANK P. HARBAUGH.

Witnesses:
H. W. GIBSON,
M. W. STREALY.